United States Patent
Muramatsu et al.

(10) Patent No.: US 6,181,672 B1
(45) Date of Patent: Jan. 30, 2001

(54) RECORDING MEDIUM AND A RECORDING SYSTEM FOR THE RECORDING MEDIUM

(75) Inventors: Eiji Muramatsu; Masahiro Kato; Makoto Sato, all of Saitama-ken (JP)

(73) Assignee: Pioneer Corporation, Tokyo (JP)

( * ) Notice: Under 35 U.S.C. 154(b), the term of this patent shall be extended for 0 days.

(21) Appl. No.: 09/419,908

(22) Filed: Oct. 18, 1999

(30) Foreign Application Priority Data

Oct. 23, 1998 (JP) .................................................. 10-301965

(51) Int. Cl.$^7$ ...................................................... G11B 7/24
(52) U.S. Cl. ..................................... 369/275.4; 369/275.1
(58) Field of Search ............................. 369/275.4, 275.1, 369/275.3, 109, 110, 112, 116, 288, 277, 13, 58, 47, 44.26, 284, 283; 428/64.1, 64.4, 64.5

(56) References Cited

U.S. PATENT DOCUMENTS 5,959,963 * 9/1999 Sugaya et al. ..................... 369/275.4
5,987,002 * 11/1999 Fukumoto et al. ................ 369/275.4
6,028,836 * 2/2000 Kosuda et al. ..................... 369/275.1

* cited by examiner

Primary Examiner—Ali Neyzari
(74) Attorney, Agent, or Firm—Arent Fox Kintner Plotkin & Kahn, PLLC

(57) ABSTRACT

A recording medium has a circular substrate, grooves formed on the substrate, a land formed between the grooves, a plurality of land prepits formed between the grooves. The groove and the land prepit are formed so as to satisfy a following formula, $$Gw/(\lambda/NA) \geq 0.2093\{Lp/(\lambda/NA)\}^2 - 0.4342 Lp/(\lambda/NA) + 0.332 - (-2.64 Gd + 0.1276)$$

where $Gw$ is the width of the groove, $Lp$ is the length of the land prepit in a radial direction of the substrate, $\lambda$ is the wave length of light used in a system for recording information on the recording medium, and NA is the numerical aperture of an objective in the system.

4 Claims, 9 Drawing Sheets

$Lp/(\lambda/NA) \approx 0.3815$ $Lp/(\lambda/NA) \approx 0.505$

US 6,181,672 B1

RECORDING MEDIUM AND A RECORDING SYSTEM FOR THE RECORDING MEDIUM

BACKGROUND OF THE INVENTION

The present invention relates to a recording medium and a recording and reproducing system for the recording medium.

Heretofore, there is known the DVD (digital versatile disc), the DVD-R (DVD WRITE ONCE) and the DVD-RW (DVD-Re-Writable) as the rewritable disc.

As shown in the Japanese Patent Laid-Open Publication No. 9-17029, the DVD-R or DVD-RW (hereinafter called DVD) has a spiral or co-axial groove for recording information, a land between the grooves and a plurality of land prepits formed between the grooves. The land prepit is provided with various sets of information such as the address.

In such a disc, it is possible to read the information recorded on the groove and the information recorded on the land prepit at the same time.

However, there is a problem that signals reproduced from the information recorded on land prepits affect the RF signal reproduced from the information recorded on the groove as offset.

SUMMARY OF THE INVENTION

An object of the present invention is to provide a recording medium wherein information recorded on the groove and the land prepit can be accurately read out and a system capable of recording and reproducing with accuracy.

According to the present invention, there is provided a recording medium having a circular substrate, grooves formed on the substrate, a land formed between the grooves, a plurality of land prepits formed between the grooves, wherein the groove and the land prepit are formed so as to satisfy a following formula, $$Gw/(\lambda/NA) = 0.2093 \{Lp/(\lambda/NA)\}^2 - 0.4342 Lp/(\lambda/NA) + 0.332$$

where Gw is the width of the groove, Lp is the length of the land prepit in a radial direction of the substrate, Gd is the depth of the groove, λ is the wave length of light used in a system for recording information on the recording medium, and NA is the numerical aperture of an objective in the system.

The present invention further provides a recording medium having a circular substrate, grooves formed on the substrate, a land formed between the grooves, a plurality of land prepits formed between the grooves, wherein the groove and the land prepit are formed so as to satisfy following formulae;

$$Gw/(\lambda/NA) \geq 0.2093 \{Lp/(\lambda/NA)\}^2 - 0.4342 Lp/(\lambda/NA) + 0.332 - (-2.64Gd + 0.1276)$$

$$Gw/(\lambda/NA) \leq 0.2093 \{Lp/(\lambda/NA)\}^2 - 0.4342 Lp/(\lambda/NA) + 0.332 + (-4.48Gd + 0.2112)$$

where Gw is the width of the groove, Lp is the length of the land prepit in a radial direction of the substrate, Gd is the depth of the groove, λ is the wave length of light used in a system for recording information on the recording medium, and NA is the numerical aperture of an objective in the system.

The present invention still further provides a system of recording a medium having a circular substrate, grooves formed on the substrate, a land formed between the grooves, a plurality of land prepits formed between the grooves, wherein a wavelength of light for recording information on the medium and a numerical aperture of an objective of the system are provided so as to satisfy following formulae, $$Gw/(\lambda/NA) \geq 0.2093 \{Lp/(\lambda/NA)\}^2 - 0.4342 Lp/(\lambda/NA) + 0.332 - (-2.64Gd + 0.1276)$$

$$Gw/(\lambda/NA) \leq 0.2093 \{Lp/(\lambda/NA)\}^2 - 0.4342 Lp/(\lambda/NA) + 0.332 + (-4.48Gd + 0.2112)$$

where Gw is the width of the groove, Lp is the length of the land prepit in a radial direction of the substrate, Gd is the depth of the groove.

BRIEF DESCRIPTION OF DRAWINGS

FIG. 1a is a perspective view of an optical DVD for explaining the present invention;

FIG. 1b is a sectional view of the disc of FIG. 1a;

DETAILED DESCRIPTION OF THE PREFERRED EMBODIMENT

Figure 1:
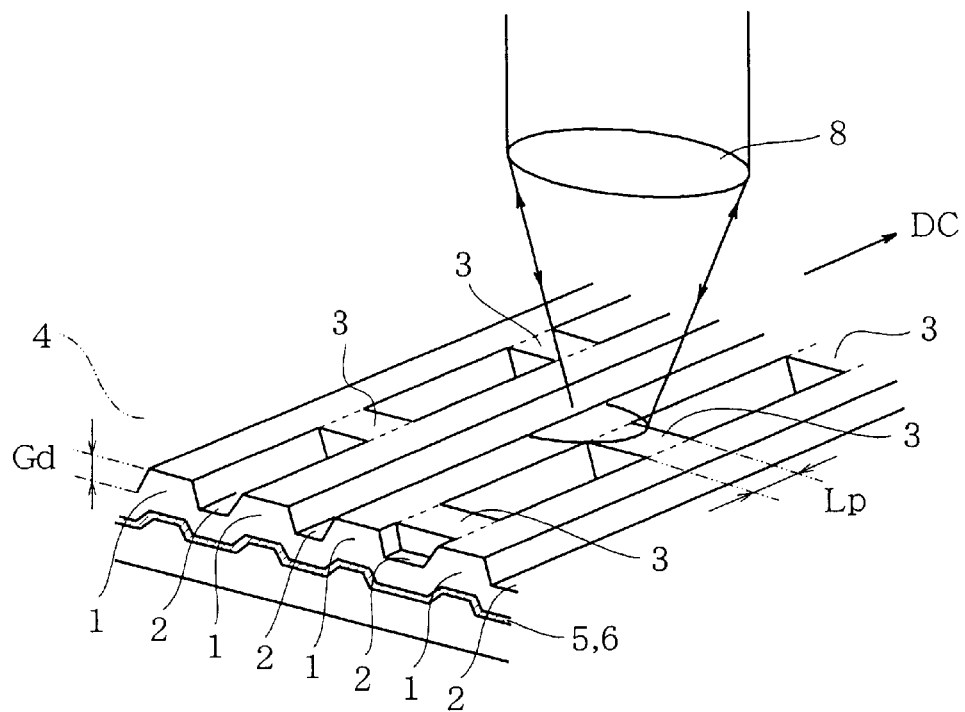
Figure 1:
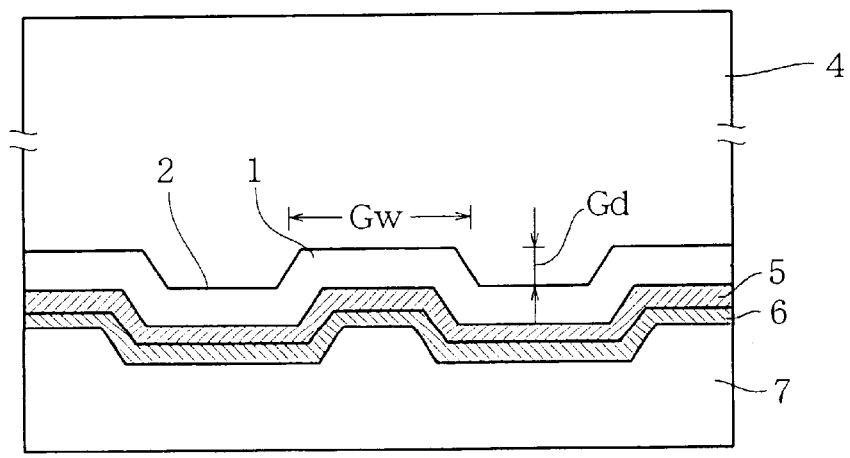

Referring to FIGS. 1a and 1b, the DVD has a transparent plastic substrate 4 made of polycarbonate. On the substrate 4, there is formed grooves 1 arranged in the circumferential direction DC, lands 2 between the grooves 1, and land prepits 3 on the land 2 formed at predetermined intervals.

Information such as video data or audio data is recorded in the groove, and information such as address is recorded in the prepit.

On the underside of the substrate 4, there is formed a recording layer 5 of organic coloring matter or inorganic metal, a reflection layer 6 and a protecting layer 7. The laser light is applied to the groove passing through an objective 8.

In accordance with the present invention, the width Gw of the groove 1, the length Lp of the land prepit in the circumferential direction, and the depth Gd of the groove are determined to particular values as described hereinafter.

Figure 2:
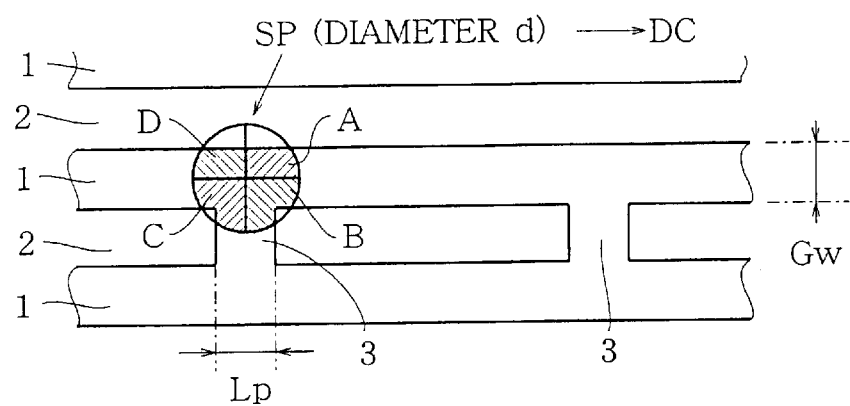
FIG. 2a is an enlarged plan view showing a part of the disc.
FIG. 2b is a block diagram of a reproducing system.
Figure 2:
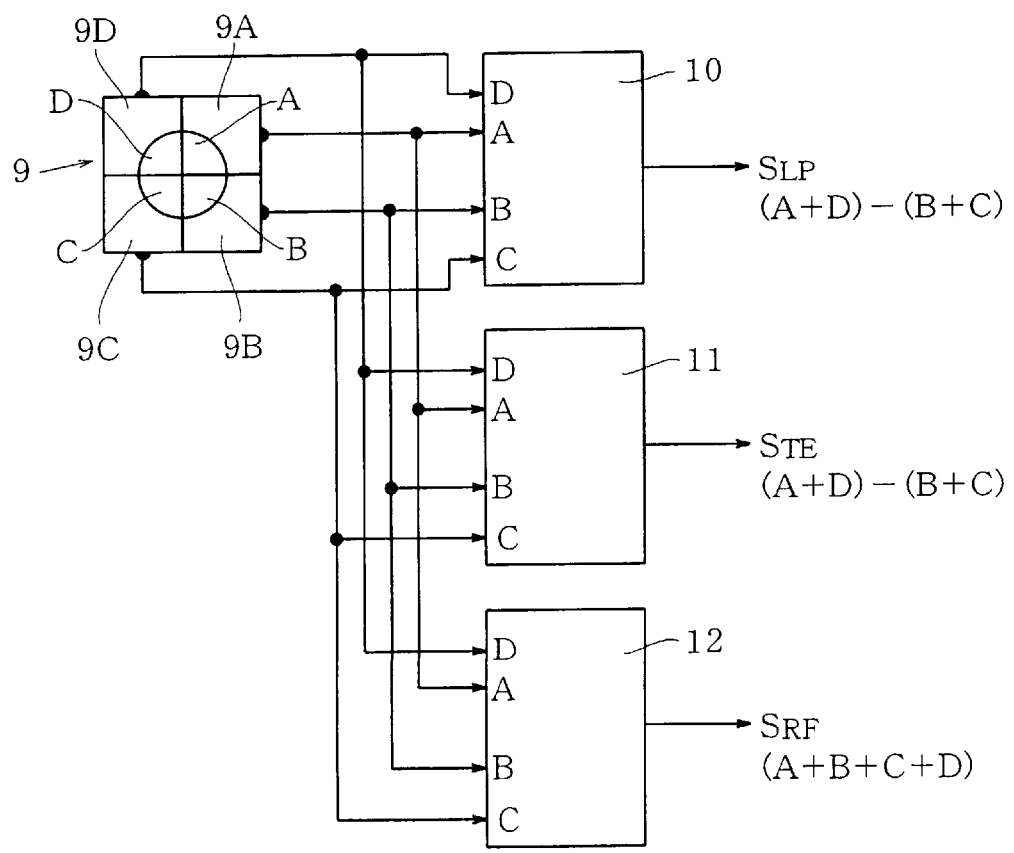

Referring to FIG. 1 showing a part of the DVD and FIG. 2b showing a reproducing system for the DVD, a light spot SP has a diameter larger than the width Gw of the groove 1 and disposed so that the center of the spot coincides with the center line of the groove 1. Thus, information recorded on the land prepit 3 can also be read as shown in FIG. 2a.

The reproducing system has a photodetector 9 comprising four elements 9A, 9B, 9C and 9D for receiving the light reflected from the disc, and adding and subtracting circuits 10 and 11 and an adder 12. The spot of the reflected light is positioned such that the center of the spot coincides with the center of the photodetector 9.

Here, the areas A and D in FIG. 2a read the information on the groove 1, and areas B and C read information on the groove 1 and land prepit 3. The photodetector 9 produces signals A, B, C and D corresponding to the areas A–D.

The adding and subtracting circuit 10 produces a land prepit signal SLp=(A+D)−(B+C), the adding and subtracting circuit 11 produces a tracking error signal STE=(A+D)−(B+C), and the adder 12 produces an RF signal SRF=A+B+C+D.

Figure 3:
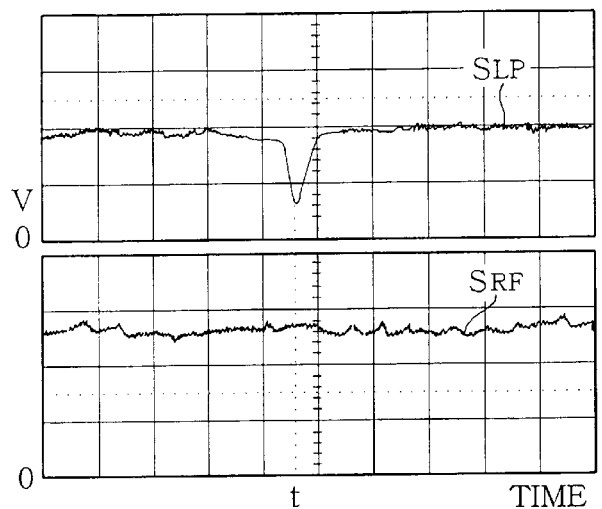
FIGS. 3a through 3c are graphs showing waveforms of a land prepit detection signal and an RF signal.
Figure 3:
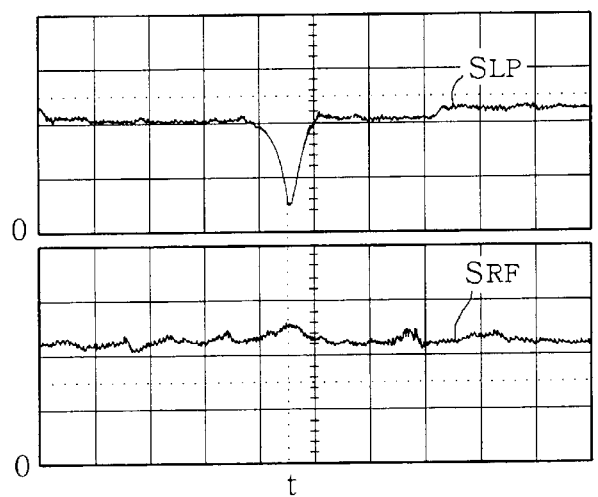
Figure 3:
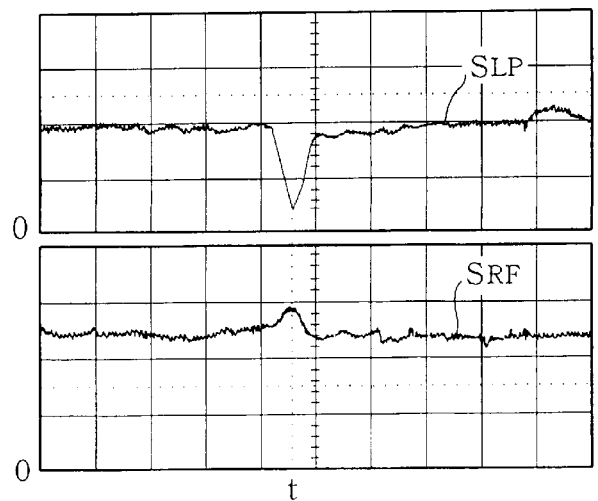

FIGS. 3a, 3b, 3c show results of reproduction experiments of the DVD-RW, where amplitude change of the land prepit signal SLp and the RF signal SRF under the condition that the wavelength λ of the spot SP and the numerical aperture NA are constant.

In the experiment of FIG. 3a, the prepit length Lp is 0.3 μm and the groove width Gw is 0.25 μm, in FIG. 3b the prepit length Lp is 0.3 μm, the groove width Gw is 0.3 μm, and in FIG. 3c Lp=0.3 μm, Gw=0.4 μm.

From the graphs, it will be understood that the voltage amplitudes of the signals SLp and SRF at the irradiation time t change with the prepit length Lp and the groove width Gw.

Figure 4:
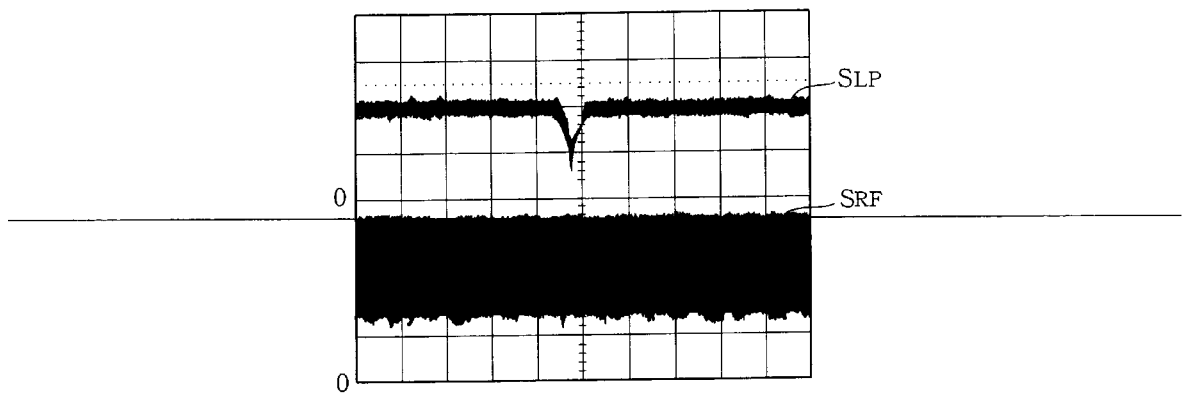
FIGS. 4a through 4c are graphs showing waveforms of a land prepit detection signal and an RF signal detected from recorded mediums.
Figure 4:
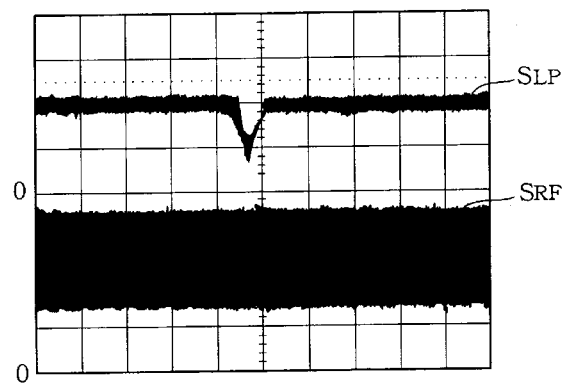
Figure 4:
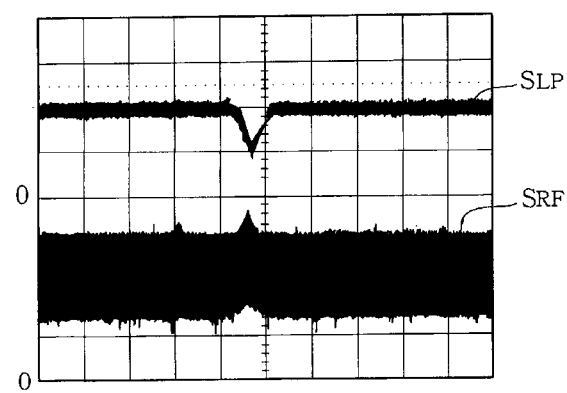

FIGS. 4a, 4b and 4c show results of experiments of the DVD-RW in which information is recorded in the groove. The conditions are the same as those of FIGS. 3a–3c.

From the graphs, it will be understood that the voltage amplitudes of the signals SLp and SRF at the irradiation time change with the prepit length Lp and the groove width Gw.

In accordance with the present invention, the groove width Gw, the prepit length Lp and the groove depth Gp are determined to optimum values as follows.

The groove width Gw, prepit length Lp, groove depth Gd, numerical aperture NA and wavelength λ are determined so that the ratio Gw/(λ/NA) of the groove width Gw to spot diameter λ/NA is set to satisfy both of following formulae (1) and (2). The ratio λ/NA of the wavelength λ to the numerical aperture NA indicates a diameter d of spot SP.

$$Gw/(\lambda/NA) \geq 0.2093\ \{Lp/(\lambda/NA)\}^2 - 0.4342 Lp/(\lambda/NA) + 0.332 - (-2.64Gd + 0.1276) \quad (1)$$

$$Gw/(\lambda/NA) \leq 0.2093\ \{Lp/(\lambda/NA)\}^2 - 0.4342 Lp/(\lambda/NA) + 0.332 + (-4.48Gd + 0.2112) \quad (2)$$

An optimum design of the DVD can be obtained by satisfying the above conditions. Namely, it is possible to detect the RF signal SRE and prepit signal SLp with high accuracy, even if the spot irradiates the groove and prepit.

The formulae (1) and (2) are verified with reference to FIGS. 5 through 13.

FIGS. 5–8 show results of experiments wherein detection accuracy of the land prepit signal SRF changes with the groove width Gw, prepit length Lp, groove depth Gd, wavelength λ and numerical aperture NA.

In the graph, the abscissa is the ratio Gw/(λ/NA) of diameter λ/NA to the groove width Gw, and the ordinate is the ratio LPP level/offset of the voltage amplitude of the land prepit signal SLp (LPP level) to the offset level (off set) of the RF signal SRF. In addition, the groove depth Gd and the prepit length Lp are changed.

The offset level (offset) is a parameter obtained by standardizing the alternating current component of the RF signal SRF of FIGS. 3a–3c with the direct current component of the signal SRF, and the voltage amplitude (LPP level) is a parameter obtained by standardizing the land prepit signal SLp with the direct current component of the RF signal SRF.

If the alternating current of the RF signal SRF is expressed by SRF (AC), the offset level (offset) is expressed by the following formula (3), voltage amplitude (LPP level) is expressed by the formula (4), and the ratio (LPP level/offset) is expressed by the formula (5).

$$\text{offset} = (SRF(AC)/SRF) \quad (3)$$

$$LPP\ \text{level} = (SLP/SRF) \quad (4)$$

$$LPP\ \text{level/offset} = (SLP/SRF(AC)) \quad (5)$$

Figure 5:
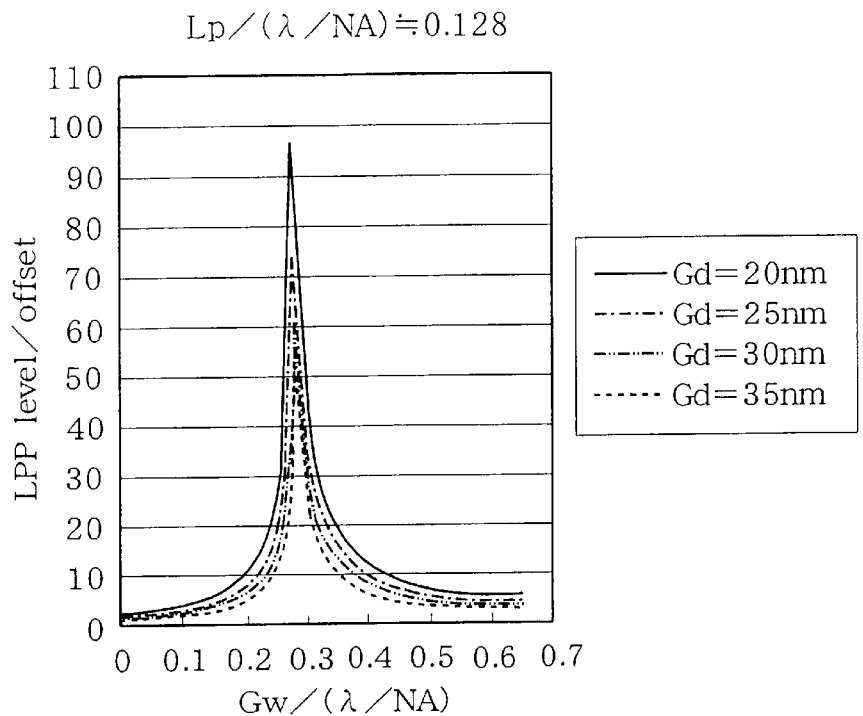
FIGS. 5 through 13 are graphs for determining optimum conditions for the land prepit are the groove of the medium.
Figure 6:
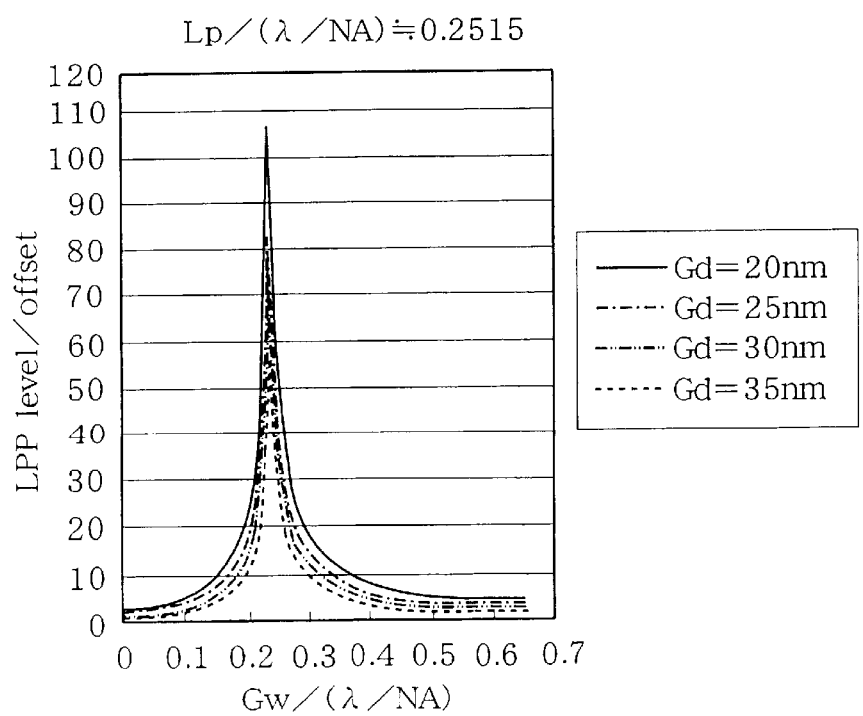
Figure 7:
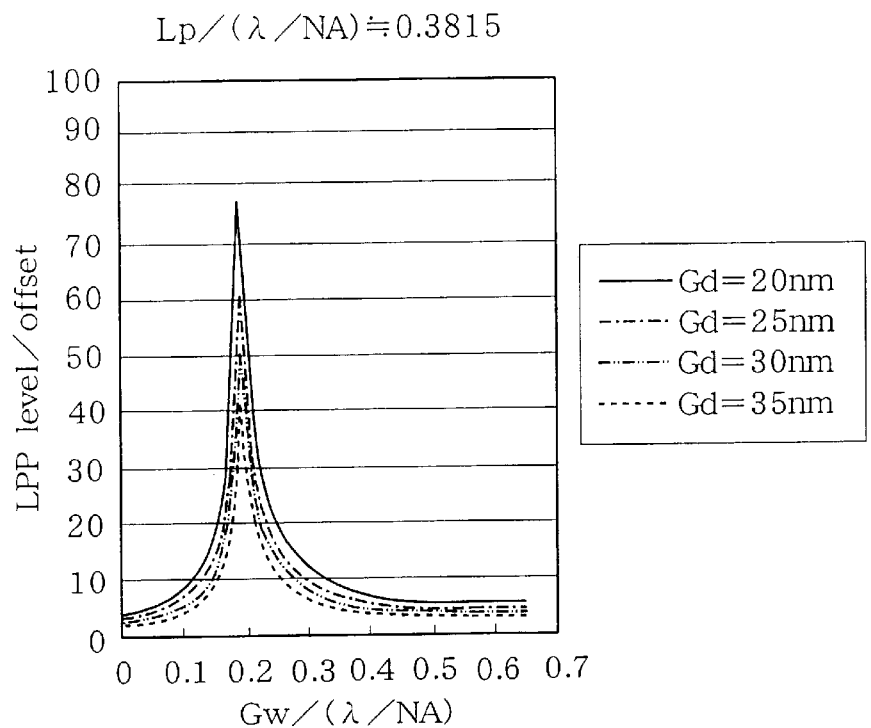
Figure 8:
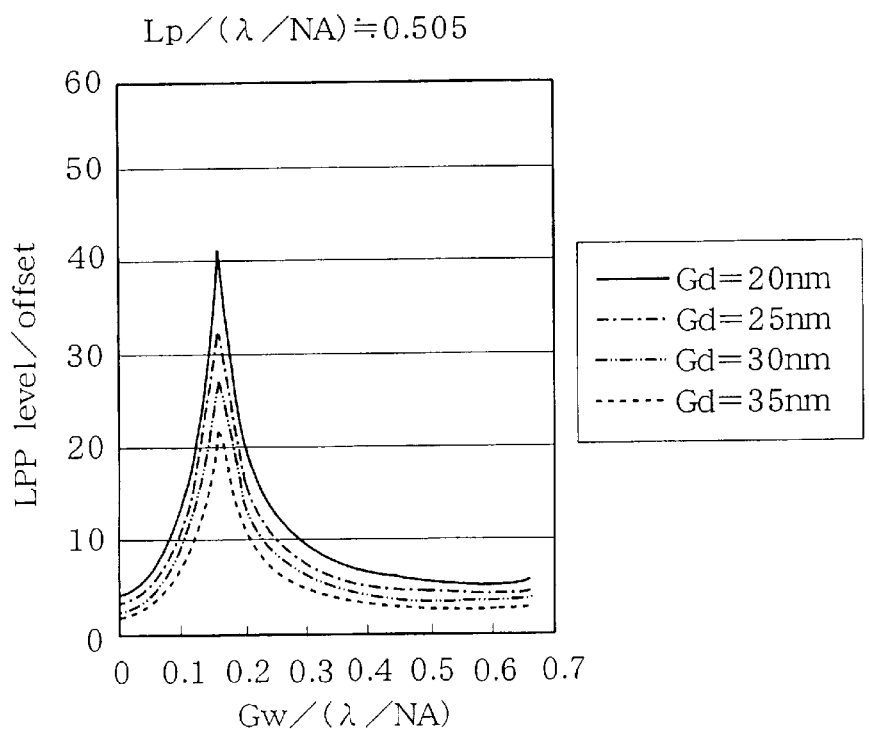
Figure 9:
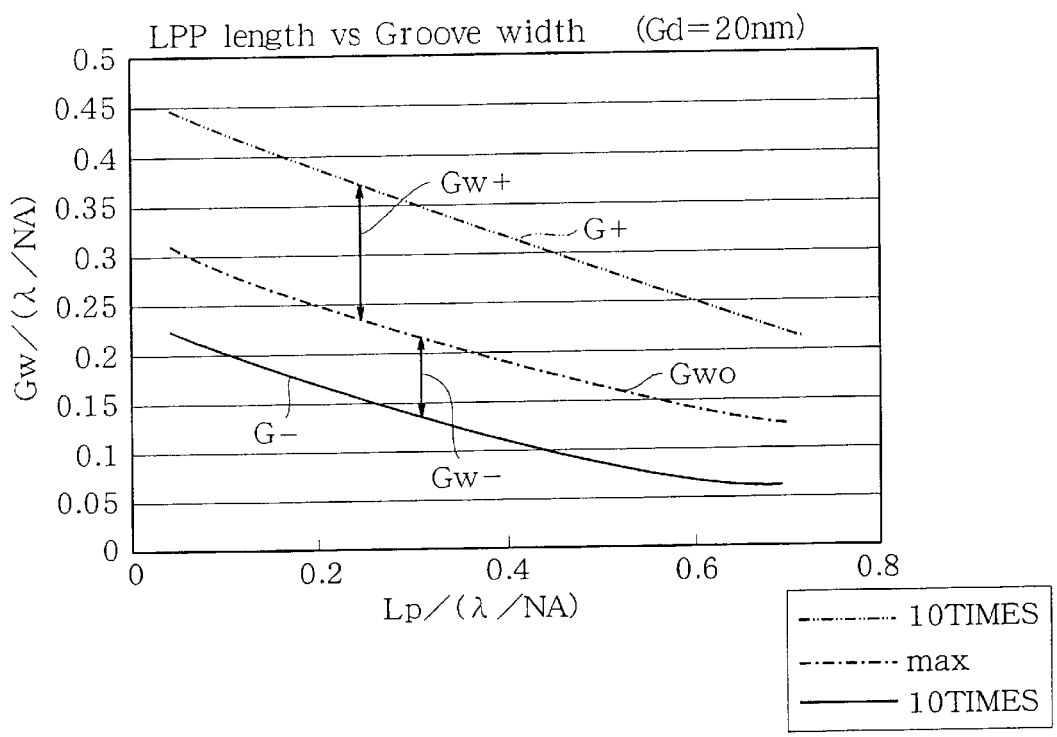
Figure 10:
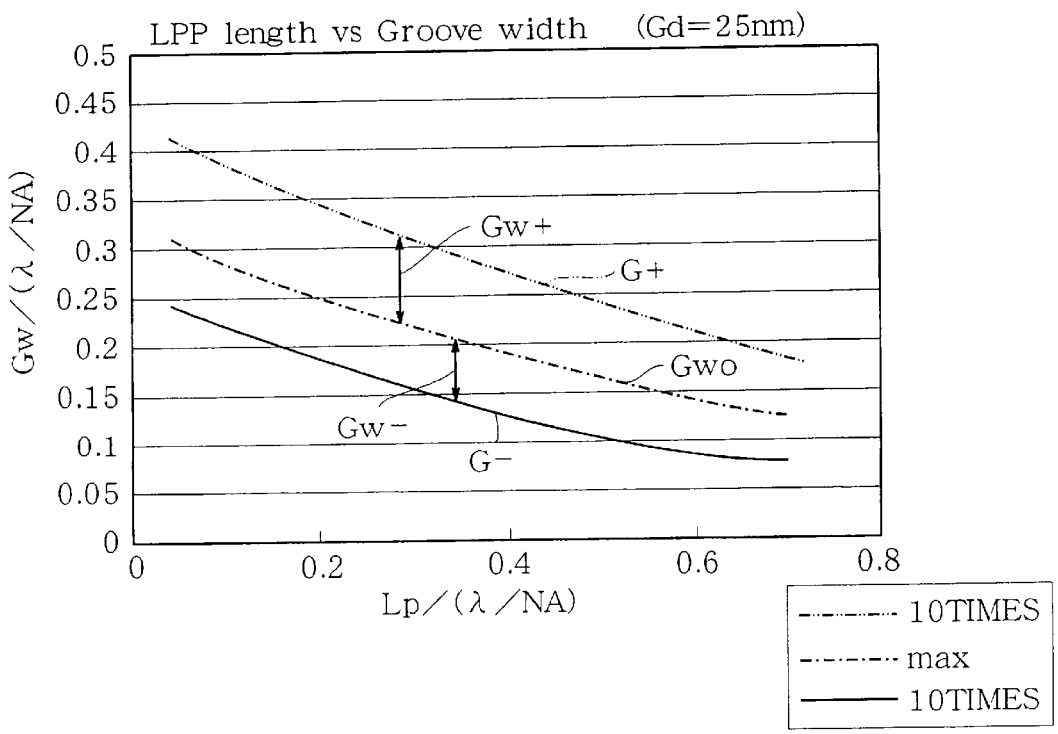
Figure 11:
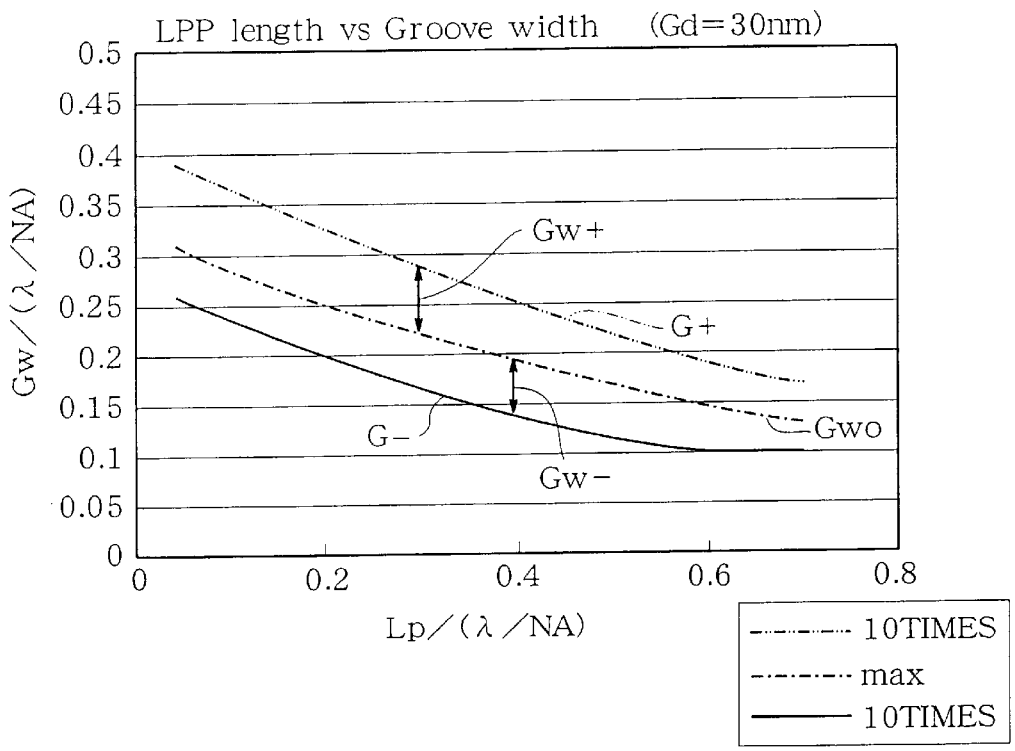
Figure 12:
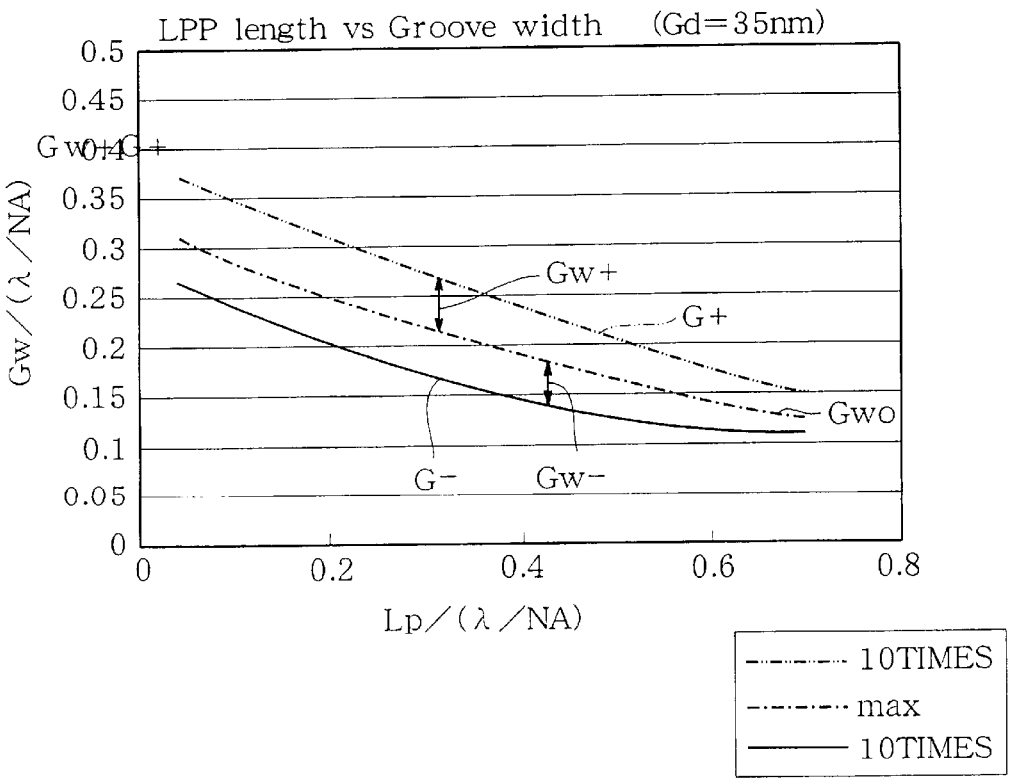

In FIGS. 5–8, the groove depth Gd is changed between 20 μm–35 μm by 5 μm. In FIG. 5, Lp/(λ/NA)=0.128, Lp/(λ/NA)=0.2515 in FIG. 6, 0.3815 in FIG. 7, 0.505 in FIG. 8.

It is confirmed that the optimum design in the condition when the value of LPP level/offset indicating the detecting accuracy of the land prepit detection signal SLp and RF signal SRF is about 10, namely LPP level/offset≈10.

FIGS. 9–12 show the relationship between Lp/(λ/NA) and Gw/(λ/NA) with the parameter of the groove depth Gd.

The line Gwo in FIGS. 9–12 is a line obtained by plotting points where the value of LPP level/offset in FIGS. 5–8 becomes maximum, and the line G+ and line G− are lines obtained by plotting points where LPP level/offset becomes about 10. Further, the line G+ is the case where LPP level/off set becomes 10 in the right side of FIGS. 5–8, the line G− is the case where LPP level/offset becomes 10 in the left side of FIGS. 5–8.

Therefore, it is understood that the ranges Gw+ and Gw− between the lines G+ and G− is the optimum design conditions. The line Gwo does not largely change, it can be expressed by the following formula (6).

$$Gw/(\lambda/NA) = 0.2093\ \{Lp/(\lambda/NA)\}^2 - 0.4342 Lp/(\lambda/NA) + 0.332 \quad (6)$$

The formula (6) shows the most optimum condition. The lines G+ and G− is approximately equal to lines formed by parallely moving the line Gwo.

Figure 13:
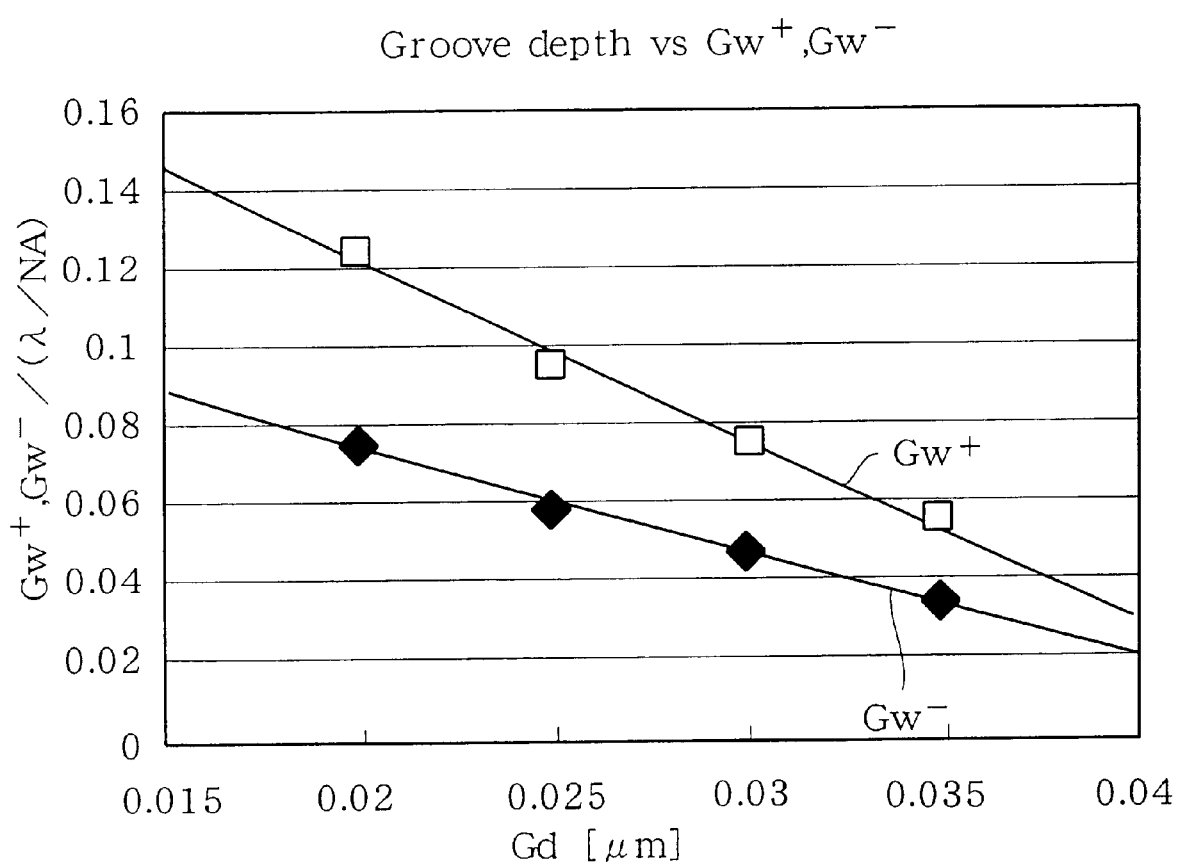

FIG. 13 shows the relationship between the groove depth Gd and Gw+/(λ/NA) and the relationship between the groove depth Gd and Gw−/(λ/NA) in which the parallel moving quantities are set to the ranges Gw+ and Gw−. The range between the lines Gw+ and Gw− is the optimum design condition. The lines Gw+ and Gw− in FIG. 13 are expressed by following formulae (7) and (8)

$$Gw/(\lambda/NA) = -4.48Gd + 0.2112 \quad (7)$$

$$Gw/(\lambda/NA) = -2.64Gd + 0.1276 \quad (8)$$

The above described formulae (1) and (2) are obtained by obtaining the range between the lines Gw+ and Gw−.

In accordance with the present invention, the groove width, groove depth and the prepit length are set to values based on optimum conditions for preventing the land prepit from affecting the detected RF signal. And, in accordance with the present invention, the wavelength of laser light and the numeral aperture are set to values based on optimum conditions, also. Therefore, it is possible to detect information recorded on the groove and the land prepit with accuracy.

While the invention has been described in conjunction with preferred specific embodiment thereof, it will be understood that this description is intended to illustrate and not limit the scope of the invention, which is defined by the following claims.

What is claimed is:

1. A recording medium having a circular substrate, grooves formed on the substrate, a land formed between the grooves, a plurality of land prepits formed between the grooves, wherein the groove and the land prepit are formed so as to satisfy a following formula, $$Gw/(\lambda/NA)=0.2093\ \{Lp/(\lambda/NA)\}^2-0.4342Lp/(\lambda/NA)+0.332$$

where Gw is the width of the groove, Lp is the length of the land prepit in a radial direction of the substrate, $\lambda$ is the wave length of light used in a system for recording information on the recording medium, and NA is the numerical aperture of an objective in the system.

2. A recording medium having a circular substrate, grooves formed on the substrate, a land formed between the grooves, a plurality of land prepits formed between the grooves, wherein the groove and the land prepit are formed so as to satisfy following formulae, $$Gw/(\lambda/NA)\geq0.2093\ \{Lp/(\lambda/NA)\}^2-0.4342Lp/(\lambda/NA)+0.332-(-2.64Gd+0.1276)$$

$$Gw/(\lambda/NA)\leq0.2093\ \{Lp/(\lambda/NA)\}^2-0.4342Lp/(\lambda/NA)+0.332+(-4.48Gd+0.2112)$$

where Gw is the width of the groove, Lp is the length of the land prepit in a radial direction of the substrate, Gd is the depth of the groove, $\lambda$ is the wave length of light used in a system for recording information on the recording medium, and NA is the numerical aperture of an objective in the system.

3. A system of recording a medium having a circular substrate, grooves formed on the substrate, a land formed between the grooves, a plurality of land prepits formed between the grooves, wherein a wavelength of light for recording information on the medium and a numerical aperture of an objective of the system are provided so as to satisfy a following formula, $$Gw/(\lambda/NA)=0.2093\ \{Lp/(\lambda/NA)\}^2-0.4342Lp/(\lambda/NA)+0.332$$

where Gw is the width of the groove, Lp is the length of the land prepit in a radial direction of the substrate.

4. A system of recording a medium having a circular substrate, grooves formed on the substrate, a land formed between the grooves, a plurality of land prepits formed between the grooves, wherein a wavelength of light for recording information on the medium and a numerical aperture of an objective of the system are provided so as to satisfy following formulae, $$Gw/(\lambda/NA)\geq0.2093\ \{Lp/(\lambda/NA)\}^2-0.4342Lp/(\lambda/NA)+0.332-(-2.64Gd+0.1276)$$

$$Gw/(\lambda/NA)\leq0.2093\ \{Lp/(\lambda/NA)\}^2-0.4342Lp/(\lambda/NA)+0.332+(-4.48Gd+0.2112)$$

where Gw is the width of the groove, Lp is the length of the land prepit in a radial direction of the substrate, Gd is the depth of the groove.

* * * * *

UNITED STATES PATENT AND TRADEMARK OFFICE
CERTIFICATE OF CORRECTION

PATENT NO.   : 6,181,672 B1
DATED        : January 30, 2001
INVENTOR(S)  : Eiji Muramatsu et al.

It is certified that error appears in the above-identified patent and that said Letters Patent is hereby corrected as shown below:

Column 5,
Lines 6 and 22, change "radial" to -- circumferential --.

Column 6,
Lines 10 and 26, change "radial" to -- circumferential --.

Signed and Sealed this

Sixteenth Day of November, 2004

JON W. DUDAS
*Director of the United States Patent and Trademark Office*